United States Patent [19]
Keijzer et al.

[11] 3,871,679
[45] Mar. 18, 1975

[54] VEHICLE LEVELING SYSTEM

[75] Inventors: Johan H. Keijzer, Hasselt; Louis J. Jossa, Truiden; Herman E. A. Renders, Diepenbeek; Alexandru Oancea, Zepperen, all of Belgium

[73] Assignee: Monroe Belgium N.V., Sint-Truiden, Germany

[22] Filed: June 14, 1973

[21] Appl. No.: 370,169

[52] U.S. Cl............................. 280/124 F, 200/61
[51] Int. Cl...................... B60g 11/56, B60g 17/00
[58] Field of Search...................... 280/12 HF, 6 H

[56] References Cited
UNITED STATES PATENTS
| | | | |
|---|---|---|---|
| 3,558,154 | 1/1971 | Jackson | 280/124 F |
| 3,574,352 | 4/1971 | Elliott | 280/124 F |
| 3,747,949 | 7/1973 | Engfer | 280/124 F |

*Primary Examiner*—Philip Goodman
*Attorney, Agent, or Firm*—Harness, Dickey & Pierce

[57] ABSTRACT

A leveling system for a vehicle having sprung and unsprung portions, the system including at least one air pressure operated leveling strut for varying the attitude between the sprung and unsprung vehicle portions, an electrically energized air compressor for supplying pressurized air to the strut, first circuit means including valve means for communicating pressurized air between the compressor and the strut, second circuit means for communicating electrical energy from a source thereof to the compressor, and a control valve responsive to orientation of the sprung vehicle portion below some predetermined position for completing the second circuit means and thereby energizing the compressor, and responsive to orientation of the sprung vehicle portion above some predetermined position for opening the valve means and communicating the first circuit means with either the atmosphere or a pressure reservoir.

12 Claims, 7 Drawing Figures

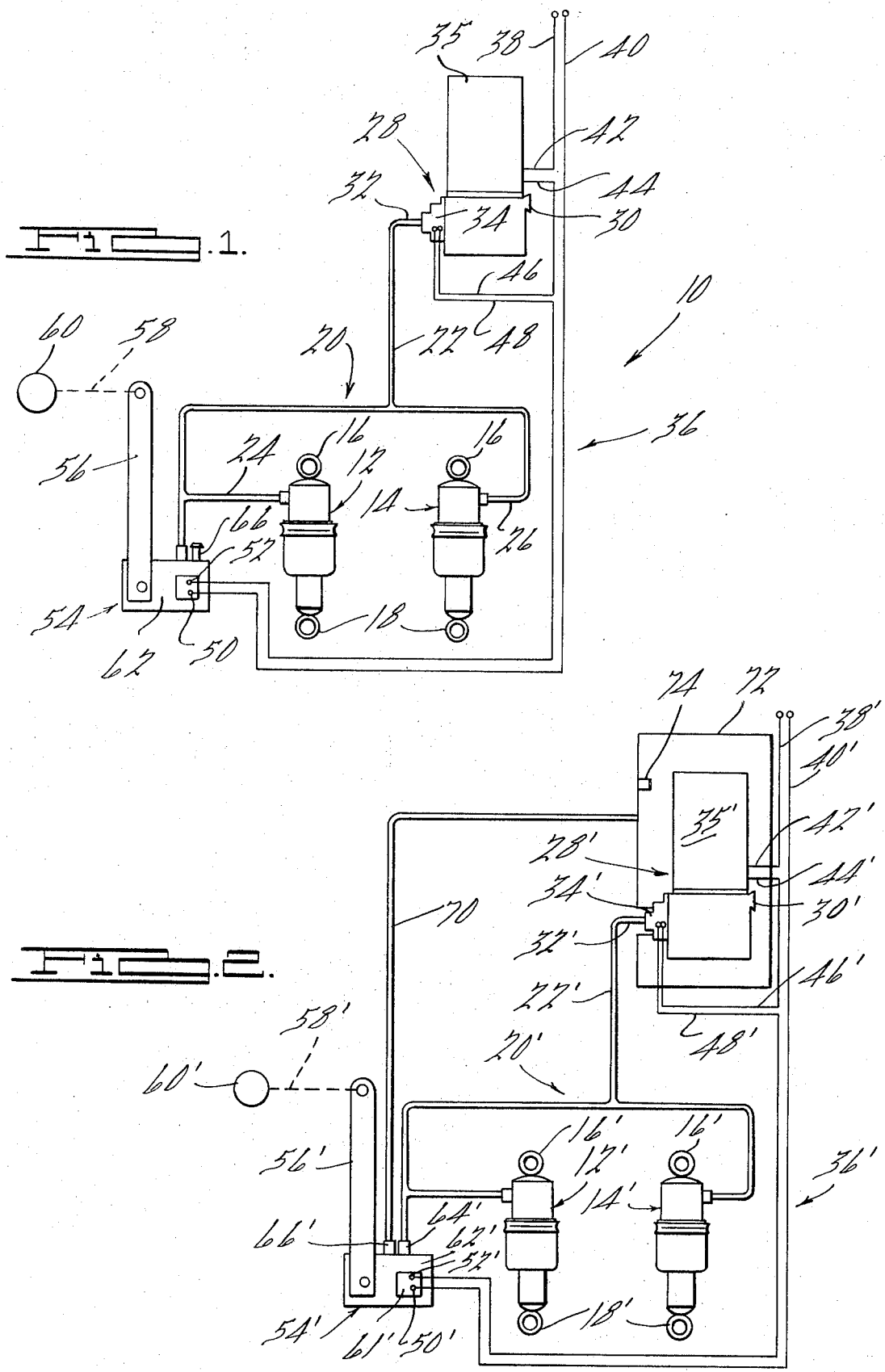

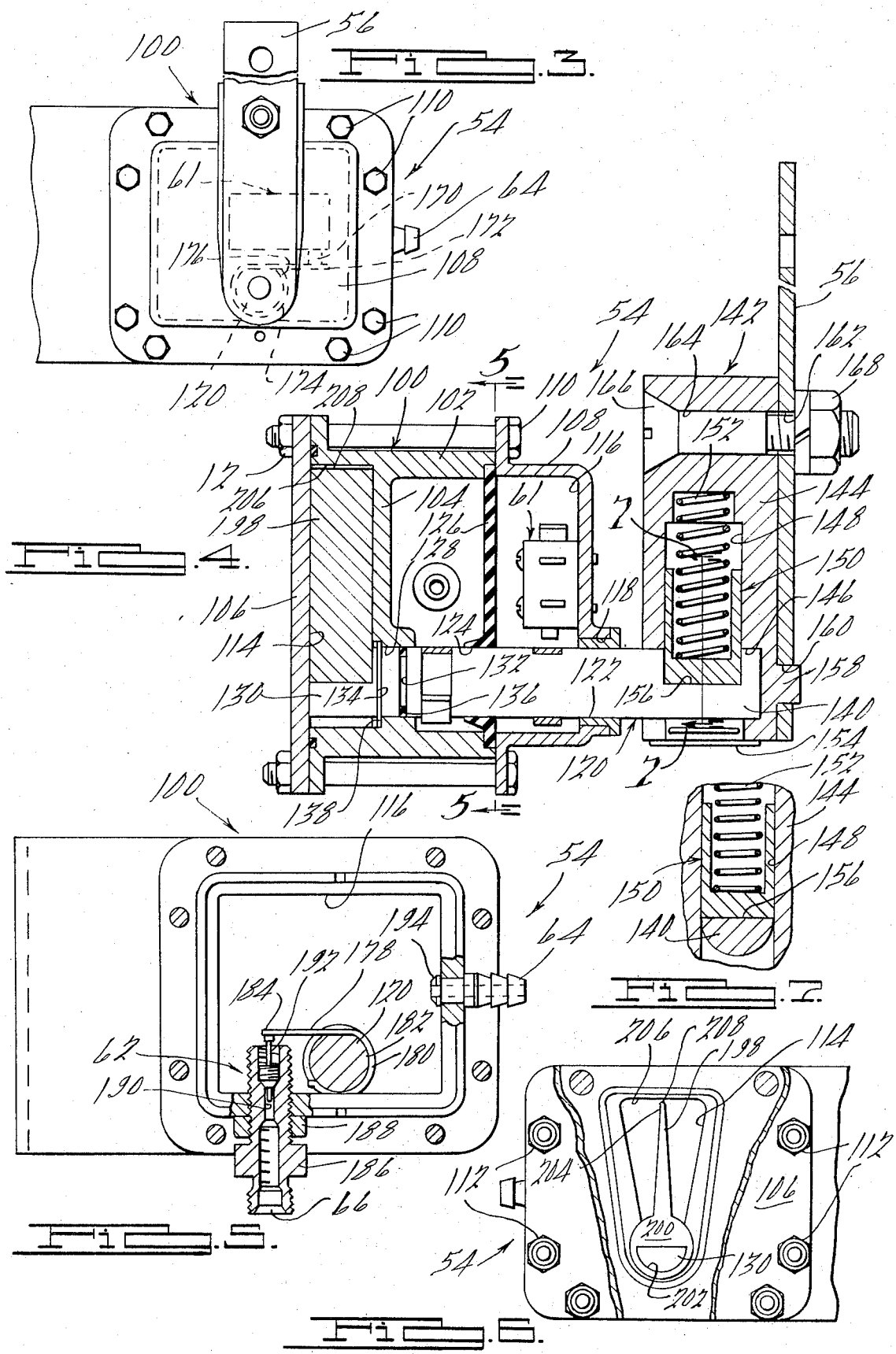

3,871,679

VEHICLE LEVELING SYSTEM

BACKGROUND OF THE INVENTION

Due to the large amount of legislation which is being enacted to require automotive vehicles and the like to be provided with some type of vehicle leveling system, the need for such leveling systems is ever increasing. Air pressure operated struts have been found to be highly desirable for use in varying the attitude of the sprung portion of a vehicle relative to the unsprung portion thereof, but since pressurization of such struts at automotive service stations has been found to be impractical, it has been found necessary to provide the associated vehicle with some type of compressor or other source of pressurized air which works in combination with a leveling valve or switch. A number of such systems are presently known such as those which operate by the vacuum of the intake manifold of the vehicle engine; however, such systems have been found to be inappropriate for vehicles which employ relatively small internal combustion engines. While a number of designs for such small engine cars have been proposed, such as that shown in U.S. Pat. No. 3,603,611, these systems have been found to be impractical due to the fact that they require large pressure accumulator tanks and relatively complex solenoid valves which function to communicate pressurized air to and from the associated struts.

Generally speaking, the present invention is directed toward a new and improved leveling system which overcomes the aforementioned objectionable characteristics of similar type systems heretofore known and used. In particular, the present invention is directed toward a novel leveling valve that may be used with leveling systems which do not require objectionable accumulator tanks and solenoid valves which are not only costly to manufacture but are expensive to operate and maintain.

It is accordingly a general object of the present invention to provide a new and improved vehicle leveling system.

It is a more particular object of the present invention to provide a new and improved leveling valve for a vehicular leveling system.

It is still a more particular object of the present invention to provide a new and improved leveling valve which is adapted for operative association with an electrically energized compressor and is operable in response to changes in attitude between the sprung and unsprung portions of the associated vehicle to effect energization of the associated compressor and effect a venting of the air system to the atmosphere when the sprung portion of the vehicle is in a relatively elevated position with respect to a desired level attitude.

It is still another object of the present invention to provide a new and improved leveling valve, as above described, which is of a relatively simple design, is economical to manufacture and easy to install.

Other objects and advantages of the present invention will become apparent from the following detailed description, taken in conjunction with the accompanying drawing.

BRIEF DESCRIPTION OF THE DRAWINGS

FIG. 1 is a schematic representation of a vehicle leveling system utilizing the leveling valve of the present invention;

FIG. 2 is a schematic representation of a modified embodiment of the leveling system shown is FIG. 1;

FIG. 3 is a side elevational view of a new and improved leveling valve of the present invention;

FIG. 4 is a transverse cross-sectional view of the leveling valve shown in FIG. 3;

FIG. 5 is a transverse cross-sectional view taken substantially along the line 5—5 of FIG. 4;

FIG. 6 is an end elevational view, partially broken away, of the leveling valve of the present invention; and FIG. 7 is an enlarged fragmentary cross-sectional view taken substantially along the line 7—7 of FIG. 4.

DESCRIPTION OF THE PREFERRED EMBODIMENT

Referring now in detail to the drawings and in particular to FIG. 1 thereof, a leveling system 10 is shown as comprising a pair of leveling struts 12 and 14 which are adapted to be longitudinally extendable and contractable for varying the attitude or orientation between the sprung and unsprung portions of an associated vehicle. The struts 12, 14 are provided with upper attachment means 16 adapted to be secured to the sprung portion of the associated vehicle and with lower attachment means 18 adapted to be secured to the unsprung portion thereof. Generally, in operation of the system 10, pressurized air is supplied to the struts 12, 14 to effect extension or expansion thereof, thereby causing the sprung portion of the vehicle to be elevated. At such time as the sprung portion of the vehicle is, for any reason, disposed above some predetermined level attitude, the pressurized air which was supplied to the struts 12, 14 is exhausted therefrom, whereby to permit collapsing or contraction thereof and hence lowering of the associated sprung vehicle portion.

The leveling system 10 includes an actuating fluid circuit, generally designated by the numeral 20, which comprises a supply conduit 22 that is communicable with a pair of inlet conduits 24 and 26 communicable with the struts 12, 14 respectively. The supply conduit 22 is communicable at its inlet end with an electrically energized combination air compressor-air dryer unit, generally designated by the numeral 28, which includes a fresh air inlet 30 and an air outlet 32 that is communicable with the compressor unit 28 via a pressure sensitive electrical switch 34. The unit 28 comprises an electrically energized drive motor 35 which, when energized, causes pressurized air to be communicated via the conduits 22, 24 and 26 to the struts 12, 14.

The leveling system 10 also comprises an electrical control circuit, generally designated by the numeral 36, which includes a pair of conductors 38, 40 which are connected to any suitable source of electrical energy, such as the battery of the associated automative vehicle. The control circuit 36 is connected to the electric drive motor 35 via conductors 42, 44. Similarly, the electrical control circuit 36 is communicable with the pressure sensitive switch 34 via conductors 46, 48. As shown in FIG. 1, the conductors 38, 40 are connected to terminals 50, 52 of a leveling valve assembly, generally designated by the numeral 54 and constructed in accordance with the principles of the present invention. Generally, speaking, the assembly 54 comprises a control lever 56 which is connected via any suitable means, representatively designated by the numeral 58, such as a bolt, bracket, etc., to the unsprung portion of the associated vehicle, such as the axle 60 thereof.

With this arrangement, at such time as there is a predetermined change in attitude between the sprung and unsprung vehicle portions, the control lever 56 will be pivoted or otherwise actuated, thus effecting actuation of the assembly 54, as will hereinafter be described. Such actuation of the lever 56 is intended to effect opening and closing of a control switch 61, thus completing the circuit between the conductors 38, 40. In addition, the assembly 54 comprises an air exhaust valve mechanism 62 which is communicable via an inlet 64 with the conduit 22 of the actuating fluid circuit 20. The valve mechanism 62 also comprises an outlet 66 which is communicable with the atmosphere.

In operation, at such time as the sprung portion of the vehicle is heavily loaded or is otherwise disposed below a preselected level attitude, the control lever 56 will be actuated, thereby actuating the switch 61 to complete the electrical control circuit 36 to the compressor unit 28. When this occurs, the motor 35 will be energized, thereby supplying pressurized air to the leveling struts 12, 14 and hence effecting expansion thereof, resulting in the sprung portion of the vehicle being elevated to some preselected level attitude. At such time as the vehicle is unloaded or for some other reason has the sprung portion thereof disposed in an attitude above a desired level attitude, the control lever 56 will again be actuated in a manner so as to effect opening of the valve 62. When this occurs, the inlet 64 will be communicated with the outlet 66, thus venting the fluid circuit 20 with the atmosphere so that the struts 12, 14 may be collapsed under the weight of the spring portion of the vehicle. At such time as the vehicle again reaches a level attitude, the control lever 56 will be actuated to effect closing of the valve 62 so that the sprung portion of the vehicle will be maintained in the aforesaid preselected level attitude. The aforementioned pressure sensitive switch 34 is provided as a safety precaution and intended to function in the manner well known in the art in preventing the drive motor 35 of the compressor unit 38 from operating indefinitely when the associated vehicle is overloaded.

FIG. 2 illustrates a slightly modified embodiment of the leveling system 10 of the present invention and all components thereof which are analagous to the components of the control system 10 are designated by like numerals with a prime suffix. The leveling system 10' shown in FIG. 2 is substantially the same as the leveling system 10, with the exception that the outlet 66' of the valve 62' is communicable via a conduit 70 with an air pressure reservoir, generally designated by the numeral 72. This arrangement is particularly adapted for closed leveling systems wherein it is desired to obviate the normal collection of moisture in the various component parts of the system. That is, the compressed air which is exhausted from the outlet 66' of the valve 62', instead of being vented to the atmosphere, is communicated back to the reservoir 72 where such air is recirculated upon the next operational cycle of the unit 28' back to the struts 12', 14'. It may be noted that a very light inlet valve 74 may be provided in the reservoir 72 to permit fresh outside air to enter the reservoir 72 during the initial operation of the unit 28', which valve 74 will only open to admit fresh outside air at such time as there is a preselected quantity of air lost due to leakage or the like.

It may be noted that while only two of the struts 12, 14 are shown with each of the systems depicted in FIGS. 1 and 2, it will be appreciated that such struts may be provided in larger numbers, such as four for various applications. In addition, it may be noted that the struts 12, 14 may, or may not, be provided with integral shock absorbers, where desired, and that the struts 12, 14 need not necessarily comprise "helper" springs, since they could very well comprise the sole spring means for the vehicle.

Referring now in detail to the construction of the leveling valve assembly 54, as best seen in FIGS. 3 through 7, the assembly 54 includes a valve housing 100 comprising a valve body 102 having a central partition section 104 and closed at the opposite ends thereof by a pair of end plates 106 and 108. The plates 106, 108 are secured to the valve body 102 by means of a plurality of bolts 110 and nuts 112, as illustrated. The end plates 106, 108, along with the partition section 104, define a pair of chambers interiorly of the housing 100, namely, a damping chamber 114 and an actuating chamber 116, the latter of which contains the switch 61 and valve mechanism 62 hereinafter to be described in detail. The end plate 108 is formed with an annular bore 118 through which an elongated cylindrical shaft 120 extends. A suitable anti-friction bushing or the like 122 is provided interjacent the outer periphery of the shaft 120 and the bore 118. The shaft 120 extends through a flanged bore 124 which is aligned with the afore-mentioned bore 118 and is formed in a separating partition or membrane 126 that is located within the actuating chamber 116. The membrane 126 functions to provide a fluid-tight barrier between the switch 61 and valve mechanism 62, as will be apparent. The shaft 120 also extends through another bore 128 which is formed in the partition section 104 and which is aligned with the afore-mentioned bores 124 and 118. The inner end of the shaft 120 terminates within the damping chamber 114 and is formed with a generally semicircular end portion 130 which functions in a manner hereinafter to be described. The periphery of the shaft 120 at a position generally axially aligned with the partition section 104 is formed with a pair of axially-spaced, radially inwardly extending grooves 132 and 134 which are respectively provided with an O-ring sealing element 136 and retaining ring or clip 138 functioning to resist axial movement of the shaft 120 within the housing 104 and to provide a fluid-tight seal between the damping chamber 114 and actuating chamber 116.

The end of the shaft 120 opposite the end portion 130 extends axially outwardly from the housing 104 and is generally designated by the numeral 140. The end portion 140 of the shaft 120 is operatively connected to the arm or lever 56 by means of an overtravel mechanism, generally designated by the numeral 142 and which is best shown in FIG. 4. Generally speaking, the function of the overtravel mechanism 142 is to absorb the difference in the degree of movement of the arm or lever 56 with respect to the amount of rotational movement of the shaft 120 required to effect actuation of the valve 54. To this end, the mechanism 142 includes an enclosure 144 which is formed with a bore 146 arranged coaxially of the aforedescribed bore 118 and within which the outer end 140 of the shaft 120 is nestingly received. The enclosure 144 also includes a bore 148 which is arranged at right angles with respect to the bore 146 and which is adapted to have a piston 150 reciprocally disposed therein. The piston 150 is resiliently urged toward the shaft 120 by means of a helical coil spring 152 disposed interiorly of the bore 148, with the outer end of the bore 148 being closed by a suitable closure or the like 154. It will be seen that the outer end 140 of the shaft 120 is formed with a generally flat recessed portion 156 which is adapted to abuttingly engage the lower end of the piston 150. The enclosure 154 is thus retained on the end portion 140 of the shaft 120 by means of the piston 150 being received in the recess 156. It will be apparent that a large reciprocal movement or stroke of the lever 56 will cause the piston 150 to be moved against the spring 152 as the piston 150 rides against the opposite edges of the recess 156 on the shaft 120, thereby absorbing the greater degree of the stroke of the lever 56 while transmitting oscillating movement to the shaft 120 to effect actuation of the valve 100 only within predetermined limits.

It will be seen that the enclosure 144 is formed with an outwardly projecting stud portion 158 which is received in and extends through a bore 160 formed in the end of the lever 56. A pair of aligned bores 160 and 162 are formed in the opposite end of the enclosure 144 and the lever 56 and are adapted to nestingly receive a suitable bolt, screw or the like 166 cooperable with a nut 168, with the bolt 166 functioning with the stud portion 158 in operatively securing the lever 56 to the overtravel mechanism 142.

As best seen in FIG. 3, the switch 61 is fixedly mounted within the chamber 16 and includes an actuating element 170 which is adapted to be selectively engaged and actuated by an arm 172 attached to the shaft 120. The arm 172 includes a circular mounting section 174 adapted to be received within a suitable annular groove 176 formed around the shaft 120. It will be appreciated that upon oscillatory or rotational movement of the shaft 120, the arm 172 will be moved toward and away from the switch 61 and hence effect actuation and de-actuation of the switch 61 through suitable movement of the actuating element 170 thereof. In particular, at such time as the sprung portion of the vehicle is oriented at some predetermined position below a level attitude, the arm 172 will effect actuation of the switch 61 which will in turn complete the electrical circuit to the compressor unit 28. When this occurs, the motor 34 will become energized, thereby supplying pressurized air to the leveling struts 12 and 14, as hereinabove discussed.

In addition to the arm 172, the shaft 120 operatively supports a second actuating arm 178 which is located on the opposite side of the membrane 126 from the arm 172. As best shown in FIG. 5, the arm 178 includes a circular mounting section 180 which is received within a suitable annular groove 182 of the shaft 120, with the arm 178 including an outer end portion 184 cooperable with the valve 62. In particular, it will be seen that the valve 62 includes a valve body 186 which defines the aforementioned exhaust outlet 66. Valve body 186 is secured to the valve assembly 100 by means of a suitable nut or the like 188, with the valve body 186 defining a longitudinally extending bore 190 which is arranged generally tangent of the shaft 120 and which is provided with a valve element 192 adapted to be selectively engaged by the outer end portion 184 of the arm 178. The valve element 192 is preferably of the type commonly utilized in inflatable tires and is commonly referred to as a "tire valve." It will be seen that the inlet 64 is communicable via a suitable fitting 194 with the interior of that portion of the chamber 116 defined between the membrane 126 and partition section 104 and hence the interior of said chamber is communicable with the struts 12 and 14. At such time as the sprung portion of the associated vehicle body is oriented above some desired level attitude, the shaft 120 will be rotated to a position wherein the outer end of the arm 178 will engage and open the valve element 192. When this occurs, the interior of the aforesaid chamber will be vented to the atmosphere so that the struts 12, 14 may be collapsed under the weight of the sprung portion of the vehicle. At such time as the vehicle reaches a relatively level attitude, the shaft 120 will rotate to a position wherein the arm 178 will permit the valve element 192 to move to a closed position, thereby terminating the venting of the system to the atmosphere. It may be noted that for certain types of open leveling systems, as is depicted in FIG. 1, the valve 62 may be provided with a minimum pressure feature which positively maintains a preselected minimum pressure within the system even though the valve element 92 is open. Such a minimum pressure valve is not required for "closed" systems of the type shown in FIG. 2 since the volume of the associated reservoir is usually determined such that the pressures within the system can never drop below a predetermined minimum.

Rotating or oscillator movement of the shaft 120 is damped by means of a damping arm 198 which is pivotably disposed within the damping chamber 114, as best seen in FIG. 6. The arm 198 includes a lower mounting section 200 which is formed with a semi-circular opening 202 adapted to nestingly receive the semi-circular end portion 130 of the shaft 120. The upper end of the arm 198, herein designated by the numeral 204, is disposed in close proximity to the upper surface 206 of the chamber 130, with a suitable flow orifice or space 208 being provided between the upper end of the arm 198 and the surface 206. The interior of the chamber 114 is filled with a suitable damping fluid which passes from one side of the arm 198 to the opposite side thereof within the chamber 114 upon rotational movement of the shaft 120 which results in a corresponding pivotal movement of the arm 198. The laterally opposite sides of the chamber 114 are engageable with the opposite sides of the arm 198 whereby to limit pivotal movement of the shaft 120 within the limits of the desired amount of movement of the actuating arms 172 and 178, thus assuring positive effective actuation and de-actuation of the switch 61 and valve mechanism 62. As will be appreciated by those skilled in the art, due to the provision of the damping arm 198, the shaft 120 will only respond to lasting changes in attitude of the sprung portion of the vehicle with respect to the unsprung portion thereof due to, for example, load changes. By means of proper control of the viscosity of the fluid disposed within the damping chamber 114 and the shape of the actual damping chamber itself and the configuration of the damping arm 198, the desired damping characteristics can be easily obtained and carefully controlled.

While it will be apparent that the preferred embodiment illustrated herein is well calculated to fulfill the objects above stated, it will be appreciated that the present invention is susceptible to modification, variation and change without departing from the scope of the invention.

We claim:

1. In combination with a leveling system for a vehicle having sprung and unsprung portions, at least one air pressure operated leveling strut for varying the attitude between the sprung and unsprung vehicle portions, an electrically energized air compressor for supplying pressurized air to said strut, first circuit means for communicating pressurized air between the compressor and the strut, second circuit means for communicating electrical energy to the compressor from a source thereof, the improvement which comprises, a leveling valve responsive to orientation of the sprung vehicle portion below some predetermined position for completing the second circuit means and thereby energizing the compressor, and responsive to orientation of the sprung vehicle portion above some predetermined position for communicating said first circuit means with a relatively lower pressure condition, said valve comprising a valve housing defining first and second chambers, an oscillatable actuating shaft journaled in said body and extending into each of said chambers, actuating means secured to said shaft in each of said chambers, switch means in one of said chambers actuatable by one of said actuating means, and valve means in the other of said chambers actuatable by the other of said actuating means for communicating the first circuit means with the relatively lower pressure condition.

2. In combination with a leveling system for a vehicle having sprung and unsprung portions, at least one air pressure operated leveling strut for varying the attitude between the sprung and unsprung vehicle portions, an electrically energized air compressor for supplying pressurized air to said strut, first circuit means for communicating pressurized air between the compressor and the strut, second circuit means for communicating electrical energy to the compressor from a source thereof, the improvement which comprises, a leveling valve responsive to orientation of the sprung vehicle portion below some predetermined position for completing the second circuit means and thereby energizing the compressor, and responsive to orientation of the sprung vehicle portion above some predetermined position for communicating said first circuit means with a relatively lower pressure condition, said valve comprising a valve body, said valve body having a fluid chamber and a separate non-fluid chamber, said chambers being disposed in parallel relation in said body, an oscillatable actuating shaft extending into said body from one side thereof through one of said chambers and then through said body between said chambers into the other of said chambers, a fluid inlet and a fluid exhaust valve in said fluid chamber, electrical circuit completing switch means in said non-fluid chamber, separate actuating elements on said shaft in each of said chambers extending generally radially therefrom and engaging respectively said exhaust valve and said switch means, a damping member disposed in a damping chamber in said body, and means operatively connecting said damping member with said shaft, whereby to effect pivotable movement of said member in response to oscillation of said shaft.

3. The invention as set forth in claim 2 which includes means providing a fluid-tight partition between said fluid and said non-fluid chambers.

4. The invention as set forth in claim 2 which includes a quantity of fluid in said damping chamber.

5. The invention as set forth in claim 4 wherein said member is pivotable about the rotational axis of said shaft to effect damping rotational movement of said shaft.

6. The invention as set forth in claim 5 which includes means defining a flow orifice between said member and the periphery of said damping chamber through which fluid must pass upon pivotal movement of said member to control damping of said shaft.

7. The invention as set forth in claim 2 wherein said valve includes a valve element which is movable within a valve bore between positions opening and closing said fluid chamber, said valve element being movable along an axis arranged generally tangent to said shaft.

8. The invention as set forth in claim 2 which includes an overtravel mechanism operatively connecting said shaft to a portion of the vehicle, said mechanism being operable to absorb a preselected amount of movement of the sprung portion of the vehicle relative to said shaft.

9. The invention as set forth in claim 8 which includes a connecting lever operatively connecting said shaft with an unsprung portion of the associated vehicle, said lever being secured to said shaft by means of said overtravel mechanism, said mechanism including a reciprocable piston and spring means biasing said piston toward said shaft.

10. The invention as set forth in claim 2 wherein said elements comprise generally hook-shaped members having outer end portions engageable with said switch and said valve and generally arcuate-shaped sections extending at least partially around said shaft and fixedly secured thereto.

11. In combination with a leveling system for a vehicle having sprung and unsprung portions, at least one air pressure operated leveling strut for varying the attitude between the sprung and unsprung vehicle portions, an electrically energized air compressor for supplying pressurized air to said strut, first circuit means for communicating pressurized air between the compressor and the strut, second circuit means for communicating electrical energy to the compressor from a source thereof, the improvement which comprises, a leveling valve responsive to orientation of the sprung vehicle portion below some predetermined position for completing the second circuit means and thereby energizing the compressor, and responsive to orientation of the sprung vehicle portion above some predetermined position for communicating said first circuit means with a relatively lower pressure condition, said valve comprising a pressurized reservoir, said valve being responsive to orientation of the sprung vehicle portion below some predetermined position for completing said second circuit means, and being responsive to orientation of said sprung vehicle portion above some predetermined position for opening said valve means and communicating said first circuit means with said reservoir, a damping chamber in said valve housing, a damping arm movable within said damping chamber in response to oscillation of an oscillatable shaft, and means including a damping fluid in said damping chamber for resisting movement of said damping arm therein.

12. In combination with a leveling system for a vehicle having sprung and unsprung portions, at least one air pressure operated leveling strut for varying the attitude between the sprung and unsprung vehicle portions, an electrically energized air compressor for supplying pressurized air to said strut, first circuit means for communicating pressurized air between the compressor and the strut, second circuit means for communicating electrical energy to the compressor from a source thereof, the improvement which comprises, a leveling valve responsive to orientation of the sprung vehicle portion below some predetermined position for completing the second circuit means and thereby energizing the compressor, and responsive to orientation of the sprung vehicle portion above some predetermined position for communicating said first circuit means with a relatively lower pressure condition, said valve comprising a pressurized reservoir, said valve being responsive to orientation of the sprung vehicle portion below some predetermined position for completing said second circuit means, and being responsive to orientation of said sprung vehicle portion above some predetermined position for opening said valve means and communicating said first circuit means with said reservoir, and an actuating member for selectively oscillating an actuating shaft and an overtravel mechanism for transmitting movement of said member to said shaft.

* * * * *